United States Patent [19]

Schewe

[11] Patent Number: 4,652,956
[45] Date of Patent: Mar. 24, 1987

[54] THIN-FILM MAGNETIC HEAD FOR PERPENDICULAR MAGNETIZATION HAVING A RING SHAPED MAGNETIC READ/WRITE CONDUCTING BODY AND WRITE COIL WINDING ARRANGED OUTSIDE THE CONDUCTING BODY

[75] Inventor: Herbert Schewe, Herzogenaurach, Fed. Rep. of Germany

[73] Assignee: Siemens Aktiengesellschaft, Munich, Fed. Rep. of Germany

[21] Appl. No.: 684,044

[22] Filed: Dec. 20, 1984

[30] Foreign Application Priority Data

Dec. 23, 1983 [DE] Fed. Rep. of Germany ....... 3346885

[51] Int. Cl.$^4$ .............................................. G11B 5/17
[52] U.S. Cl. ..................................... 360/123; 360/125
[58] Field of Search ............................... 360/122–123, 360/125–126

[56] References Cited

U.S. PATENT DOCUMENTS 4,287,544 9/1981 Lazzari ................................. 360/131
4,533,967 8/1985 Conly et al. ........................ 360/123
4,546,398 10/1985 Toda et al. ....................... 360/123 X

FOREIGN PATENT DOCUMENTS 0012910 7/1980 European Pat. Off. .
0071489 2/1983 European Pat. Off. .
2924013 1/1980 Fed. Rep. of Germany .
55-12522A 1/1980 Japan ................................... 360/126

OTHER PUBLICATIONS

"IEEE Transactions on Magnetics" vol. MAG-16, No. 1 (Jan. 1980), pp. 71-76.
"IEEE Transactions on Magnetics" vol. MAG-18, No. 6 (Nov. 1982), pp. 1170-1172, 1158-1163.
"IEEE Transactions on Magnetics" vol. MAG-17, No. 6 (Nov. 1981), pp. 2538-2540, 3120-3122.
"IEEE Transactions on Magnetics" vol. MAG-16, No. 5 (Sep. 1980), pp. 967-972.

Primary Examiner—John H. Wolff
Attorney, Agent, or Firm—Kenyon & Kenyon

[57] ABSTRACT

A thin-film magnetic head comprising a stratified build-up on a non-magnetic substrate for a recording medium that can be magnetized perpendicularly comprises a ring-head-like conduction body having two magnet legs, of which the poles facing the recording medium are arranged in tandem as seen in the direction of motion of the head, and having a predetermined distance from each other, and an at least largely flat coil winding, the turns of which extend through a space formed between the magnet legs. With this magnetic head, it is possible to generate a sufficiently high read voltage and to provide a magnetic head wherein the write and read function can be switched. To this end, the conduction body carrying the magnetic flux comprises, besides the ring-head-like head part formed by the two magnet legs, a leg part extending beyond the head part. Furthermore, besides the one coil winding serving only for the read function, an additional, at least largely flat coil winding is provided for the write function, this winding being arranged magnetically and geometrically separated from the read coil winding, one of the magnet legs of the ring-head-like head part and the extended leg part having corresponding geometric dimensions extending between these coil windings.

12 Claims, 4 Drawing Figures

THIN-FILM MAGNETIC HEAD FOR PERPENDICULAR MAGNETIZATION HAVING A RING SHAPED MAGNETIC READ/WRITE CONDUCTING BODY AND WRITE COIL WINDING ARRANGED OUTSIDE THE CONDUCTING BODY

BACKGROUND OF THE INVENTION

The present invention relates to a thin-film magnetic head formed by stratified build-up on a nonmagnetic substrate for recording into a recording medium which is provided with a magnetizable storage layer, and into which information can be written along a track by perpendicular or vertical magnetization of the storage layer. Such a magnetic head comprises a ring-head-like magnetic conduction body for carrying magnetic flux having two magnet legs, the poles of which facing the recording medium are arranged in tandem, as seen in the direction of motion of the head, and which have a predetermined spacing from each other. Such heads further contain an at least largely flat coil winding, the turns of which extend through a space formed between the magnet legs. Such a magnetic head is shown in European Patent Application EP No. 0 012 910 A1, for example.

The principle of perpendicular magnetiziaiton for storing informaiton is generally known. See, for instance, IEEE Transactions on Magnetics, vol. MAG-16, no. 1, January 1980, pages 71 to 76; DE-OS No. 29 24 013; U.S. Pat. No. 4,287,544; or the above cited European Patent Application. This principle, which is frequently also called vertical magnetization, utilized special recording media in the form of rigid magnetic storage discs, flexible individual discs (floppy discs) or magnetic tapes. The recording medium has at least one magnetizable storage layer of predetermined thickness which contains a magnetically anisotropic material, especially of a CoCr alloy. The axis of the so-called easy magnetization of this layer points perpendicularly to the surface of the medium. By means of a special magnetic head, the individual pieces of information are then recorded along a track in successive sections, also called cells or blocks, by appropriate magnetization of the storage layer. In practice, the magnetic flux changes, i.e., the transitions from one direction of magnetization to the opposite one, are generally used as information. The sections have a predetermined dimension, also called wavelength, in the longitudinal direction of the track. As compared with the limit which is required by the method of longitudinal or horizontal storage by demagnetization, this dimension can be substantially smaller. Thus, the information density in the recording medium advantageously can be increased according to the principle of perpendicular magnetization.

The combined read-and-write heads, i.e., those with which both a write as well as a read function can be executed, and which are known for use with the principle of longitudinal magnetization, however, cannot be used directly also for perpendicular magnetization. If these heads, which generally have the shape of ring heads, are used, the conduction of the flux generally desired also for use with the principle of perpendicular magnetization, for a circuit closed as far as possible, can be achieved with low magnetic resistance. However, writing of both poles of these ring heads can then scarcely be suppressed, so that similar difficulties result in reading the written information.

One is therefore compelled to develop special write and read heads which use the principle of perpendicular magnetization. A magnetic head suitable therefor generally comprises a so-called main pole, by which a perpendicular magnetic field sufficiently strong for remagnetizing the individual sections of the storage layer is produced. The required magnetic return can then be accomplished, for instance, by a so-called auxiliary pole on the opposite side of the recording medium. See the above-mentioned literature reference, IEEE Trans. Magn., vol. MAG-16. A magnetic return can also be made with a separate auxiliary pole which is located on the same side as the main pole. See IEEE Trans. Magn. vol. MAG-17, no. 6, November 1981, pages 3120 to 3122, or vol. MAG-18, no. 6, November 1982, pages 1158 to 1163 or the above cited patent publications. Accordingly, the magnetic write and read head known from the above mentioned European patent application contains a ring-head-like conducting body of two magnet legs which carries the magnetic flux, the ends of which, facing the recording medium, form a main and an auxiliary pole, and which are arranged in tandem as seen in the direction of motion of the head and at a predetermined distance from each other. The turns of an at least largely planar coil winding extend through a space which is formed between these two magnet legs, the space being filled with an insulating material. With this winding, the main pole is excited for the writing function and for the read function, the excitation of the main pole is measured. The turns of this winding as well as the magnet legs are applied by thinfilm technology on a nonmagnetic substrate.

In the magnetic-head type known, for instance, from the above patent documents, the auxiliary pole serves in any case only for returning the magnetic flux. Cross writing of the auxiliary pole can possibly be tolerated because the recording main pole always lags it and therefore over-writes information possibly written by the auxiliary pole. In order, however, to prevent, at least largely, concurrent reading of the auxiliary pole with its trailing edge, the so-called air gap formed between the two poles would have to be relatively wide so that a far-reaching reduction of the magnetic flux density at the auxiliary pole can be ensured. Suitably wide gap layers, however, can be realized by the thin-film technique only with difficulty.

Because of these difficulties, magnetic heads have also been proposed in which the use of a separate auxiliary pole is dispensed with. See IEEE Trans. Magn., vol. MAG-18, no. 6, November 1982, pages 1170 to 1172; EP No. 0 071 489 A2. In these magnetic heads, the necessary magnetic return is accomplished by the stray flux. Accordingly, the magnetic head known from these references contains substantially only a single magnet leg which faces the recording medium and which is associated with a planar writing coil winding. While a sufficiently distinct and high-frequency write signal can be generated with such a magnetic head, which is also called a single pole head, if the inductance of the coil winding is not too high, a sufficiently large read signal cannot be obtained, on the other hand, if the auxiliary pole is missing.

Due to these mentioned problems, systems with separate write and read heads are also known so that these heads can be adapted optimally to the respective function. See IEEE Trans-Magn. vol. MAG-16, no. 5, September 1980, pages 967 to 972, or vol. MAG-17, no. 6, November 1981, pages 2538 to 2540. For reading, ring heads known per se from the principle of longitudinal magnetization can be used, while recording must be carried out with the mentioned single-pole heads. These single-pole heads can have an auxiliary pole on the back side of the recording medium. Such systems for reading and recording with separate special heads adapted to the respective function, however, are relatively elaborate in their design.

SUMMARY OF THE INVENTION

It is an object of the present invention to improve the write and read head mentioned above such that a switchable write and read function according to the principle of perpendicular magnetization having relatively high efficiency may be provided. In particular, a sufficiently high read voltage should therefore be obtainable with this magnetic head.

These and other objects of the present invention are achieved by a magnetic thin film head having conducting body for carrying magnetic flux, the conducting body comprising a ring-shaped member formed by two magnet legs, and further having one of said legs extending beyond a side of the head facing away from the recording medium, and wherein, in addition to a coil winding serving only for the read function, an additional coil winding which is at least largely flat, is provided for the write function and which is arranged magnetically and physically separately from the read coil winding, one of the magnet legs of the ring-shaped member and the extended leg extending with corresponding geometric dimensions between the two coil windings.

Due to the extension of the conducting body for carrying the magnetic flux beyond the ring-shaped member by means of the extended leg, a complete magnetic separation of the additional coil winding serving only as a recording or writing coil, besides an electric or galvanic separation, from the winding serving only as a read coil, is achieved. The advantages connected with this design of the magnetic head are seen particularly in the fact that due to the electric or galvanic separation, the recording coil needs to be made with only a small number of turns. Thereby, technologically difficult structuring problems in the manufacture of this coil winding can be avoided.

On the other hand, however, the read coil winding, which draws only relatively little current, can be structured very finely. This means a corresponding increase of the read voltage, since the number of turns of this winding can be chosen rather large. With the magnetic decoupling of the two coil windings, high voltage peaks furthermore can be avoided which occur during the recording function at the input of a sensitive read amplifier connected thereto.

Since furthermore, the writing coil winding in the magnetic head according to the invention lies outside the ring-shaped member formed by the two magnet legs, there are caused to develop in these two magnet legs during the recording function by a relatively large write current in the recording coil winding, magnetic fluxes which are directed in the poles facing the recording medium at least largely perpendicular to the surface of the medium. This means that the magnetic head writes with these poles, advantageously as a quasi single pole head, the information into the recording medium. The other coil winding serving as the read coil then remains without current. Its winding part extending through the space between the two magnet legs is advantageously located in a field-free space. For reading with the magnetic head according to the principle of perpendicular magnetization, the additional recording coil winding remains out of operation. For this read function, the magnetic head can be operated as a ring head in a manner known per se.

BRIEF DESCRIPTION OF THE DRAWINGS

The invention will be explained in greater detail in the following detailed description, with reference to the drawings in which.

DETAILED DESCRIPTION

Figure 1:
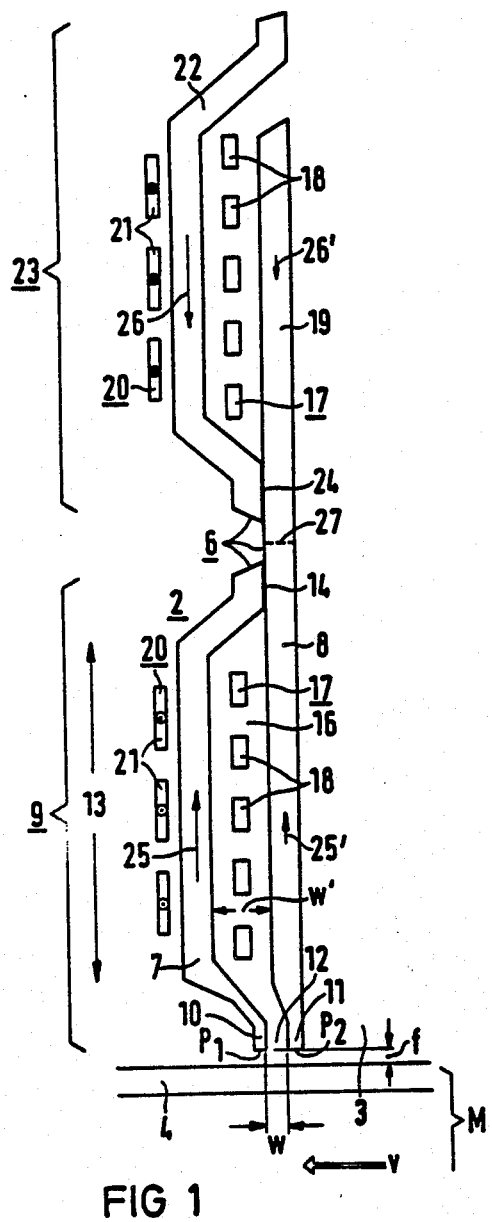
FIG. 1 shows schematically a longitudinal section of an embodiment of a magnetic head according to the invention.

With reference now to the drawings, the magnetic write and read head according to the invention includes a ring-head-like embodiment known per se for use with the principle of perpendicular or vertical magnetization. See, for instance, the above mentioned EP Nos. 0 012 910 A1 and 0 071 489 A2. The head, generally designated in FIG. 1 with 2, which is shown for instance, during its write function, is located on the flat side of a substrate 3 which forms, for instance, the front or back side of a conventional element which is designated as a "flying body" and not detailed in the figure. This head can be guided along a track relative to a recording medium M which is known per se and can be magnetized vertically at a small flying height f of, for instance, 0.2 um above a special storage layer 4 of this medium, for instance, of CoCr. In general, the recording medium is guided under the head. The corresponding relative direction of motion of the recording medium M relative to the magnetic head 2 is indicated by an arrow v.

The magnetic head 2 contains a magnetic condition body 6 carrying the magnetic flux with two magnet legs 7 and 8 which form a ring-head-like head part 9. These legs are aligned largely and in particular, at their ends 10 and 11 facing the recording medium, at least approximately perpendicularly to the surface of the recording medium M and form respective magnetic poles $P_1$ and $P_2$. Between these two poles, an air gap 12 is formed with an advantageously small longitudinal width w, i.e., pointing in the direction of motion v, of less than 1 um, and especially less than 0.3 um. In a central region 13 of the ring-head-like head part 9, the distance between the two magnet legs 7 and 8 is made larger than the gap width w in that the magnet leg 7 which is rearward with respect to the direction of motion, for instance, is shaped in this region such that the spacing increases to a larger distance w' with respect to the front magnet leg 8 which is straight and is closest to the substrate 3. Outside this region 13, the magnet leg 7 is joined to the magnet leg 8 on the side facing away from the recording medium M in a manner known per se at 14, so that the ring-head-like shape of the head part 9 is obtained. Through the space 16 thus left between the two magnet legs 7 and 8 in the central region 13 extends a flat coil winding 17 which serves as a read coil. This read coil, however, remains without current for the write function assumed in the figure. During this function, the read coil winding is advantageously connected or shorted at its ends by a resistor of sufficiently low resistance in order to prevent damage to a read amplifier connected thereto by induced voltage spikes. Only a single layer with turns 18 is shown of the coil winding 17, although this coil winding is generally designed having more layers. So that these layers can be placed on a surface as flat as possible, the magnet leg 8 facing the substrate 3 is extended, according to the embodiment shown in FIG. 1, beyond its joining region 14 with the magnet leg 7. Its extension section is designated with 19.

According to the invention, an additional at least largely planar coil winding 20 for the write function is provided, which is assigned to one of the two magnet legs, for instance, the outer one, i.e., the leg 7 facing away from the substrate 3. The turns 21 of this write coil winding 20 arranged in a plane at least largely parallel to the read coil winding 17 cover part of the outer magnet leg 7 in the region 13 of the ring-head-like head part 9. Since these turns should be separate physically, as well as, particularly, magnetically, from the turns 18 of the read coil winding 17 not only in the region 13 but also outside the ring-head-like head part 9, the conduction body 6 carrying the magnetic flux must be extended between these windings accordingly by means of a further leg part 22 outside the ring-head-like head part 9 on the side facing away from the recording medium M. The so realized extension part of the conduction body 6 beyond the head part 9 is generally designated in the figure with 23. According to the embodiment shown, the leg part 22 is joined in the vicinity of the junction 14 between the magnet legs 7 and 8 to the extended magnet leg 8 in a zone 24. An order to ensure a complete magnetic separation of the two coil windings 17 and 20, the magnet leg 7 and the leg part 22 must have, of course, a geometric extent which includes at least the overlap region of these two coil windings.

With a given write current which is illustrated by the indicated current flow direction symbols shown and which is relatively large, a magnetic flux of opposite directions is produced in the magnet leg 7 and in the extended leg part 22 as indicated by arrows 25 and 26. In a transition region 27 between the magnet leg 7 and the leg part 22, this magnetic flux is zero, so that there a corresponding interruption of the conduction body 6 can be provided. By the write coil winding 20 is generated also in the magnet leg 8 which is more remote therefrom, an even more attenuated magnetic flux which is directed parallel to the flux directions 25 and 26. This at most very weak flux is indicated by arrows 25' and 26'. Essentially, however, the write function at the pole $P_1$ is executed only by the magnetic flux 25 of the magnet leg 7. The magnetic head 2 according to the invention therefore writes advantageously like a quasi single-pole head. Except for this write function, however, the coil winding 20 remains without current, so that then the magnetic head 2 is operated with the read coil winding 17 as an ordinary ring head.

For fabricating the magnetic head 2 by a thin-layer or thin-film technique, a flying body with a substrate is generally used which comprises, for instance, TiC and $Al_2O_3$. Optionally, the corresponding substrate 3 can further be provided with a sufficiently thick insulating layer, for instance, of $Al_2O_3$. For the construction of the magnet legs 7 and 8 as well as of the leg part 22, thin magnetic layers of special magnetically soft materials such as special NiFe alloys (permalloy: Ni/Fe-81/19) or of FeB are applied by sputtering, vapor deposition or electroplating and are separated from each other by a nonmagnetic spacer, for instance, of $SiO_2$ or $Al_2O_3$. The magnetization of these magnetic layers is in the plane of the layer. Due to the manufacturing process, the magnetic layers exhibit uniaxial anisotropy, i.e., each magnetic layer has two anisotropic axes rotated by 90° which are designated as the easy or hard direction of magnetization. The magnetization is preferably parallel or antiparallel to the easy direction. The easy direction of magnetization can be induced, for instance, by an applied magnetic field when the respective layer is applied. In general, it is always perpendicular to the direction of the magnetic flux in the conduction body 6 i.e. essentially parallel to the surface of the recording medium M in the vicinity of the magnet poles $P_1$ and $P_2$. The different grown layers are structed by techniques known per se such as photo lithography, plasma, ion beam or chemical wet-etching, and the magnet legs of the head are made thereby.

For constructing the magnetic head 2, the layers of the first extended magnet leg 8 are first applied to the susbtrate 3 or its insulating layer. This magnet leg is relatively thick with the exception of the area of its pole tip $P_2$, for instance, 2 to 4 um and is tapered toward the pole tip $P_2$ to about 0.2 to 1 um. Except for the junction points 14 and 24 with the second magnet leg 7 or the extended leg part 22, the magnet leg 8 is then coated with an insulating and gap layer. This gap layer comprises, for instance, $Al_2O_3$ or $SiO_2$. After this magnet leg 8 and the gap layer are completed, the individual turns 18 of the winding 17 serving as the read coil are likewise fabricated and structured by a thin-film technique in at least one plane parallel to the substrate surface. Since the currents induced in the winding 17 are very small, the conductor cross section practically need not be determined by the electric load. For manufacturing reasons, however, extremely small thicknesses and very fine structures should be avoided. The turns comprising, for instance, Cu, Au or Al, which in general have many layers, may, for instance, have cross sections of 0.1 um by 3 um and are embedded in a special levelling material. This material may be, for instance, a synthetic varnish, especially with a polyimide base.

In a next process step, the second laminated magnet leg 7 as well as the leg part 22 are then structured. The magnetic layers of the leg 7 are then separated in the vicinity of the gap 12 only via the gap layer and additionally in the central region 13 via the levelling layers with the embedded turns 18 of the coil winding 17 from the magnet leg 8. In the region of the junction 14, both magnet legs 7 and 8 are joined together, so that a ring-head-like shape of the magnetic head is achieved. Outside of this ring-head-like head part 9, the design of the individual layers is similar.

Subsequently, a further insulating layer is deposited on the magnet leg 7 as well as the leg part 22 before the individual turns 21 of the write coil winding 20 are put in place and structured in at least one plane parallel to the substrate surface or to the read coil winding 17. Lastly, a relatively thick protective layer, for instance, of $Al_2O_3$, is provided for the protection of the thin-layer magnetic head 2 so manufactured.

Figure 2:
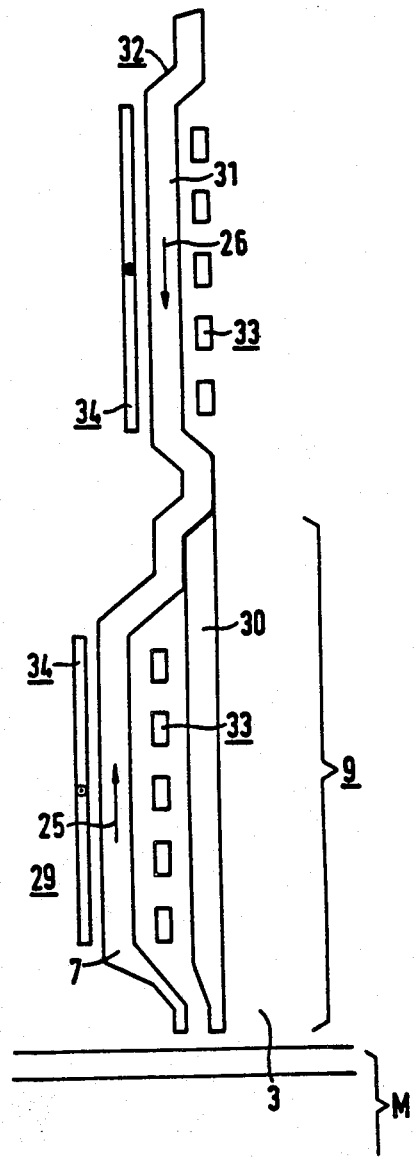
FIGS. 2 to 4 show further embodiments of magnetic heads according to the invention in similar presentations.
Figure 3:
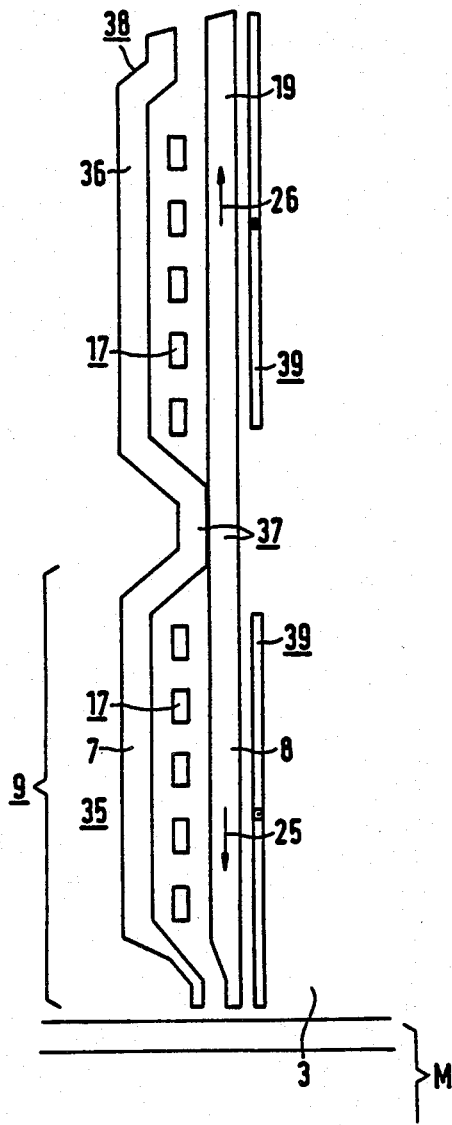
Figure 4:
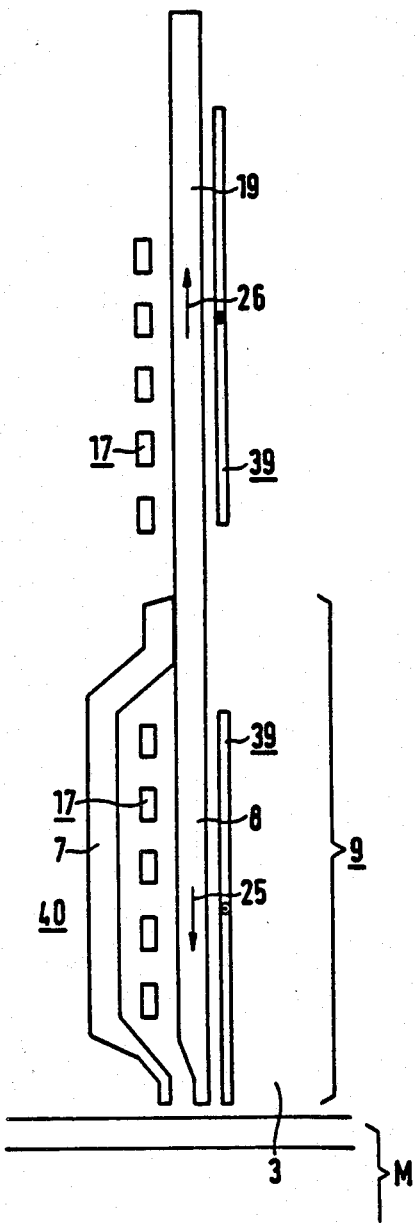

The embodiments indicated in FIGS. 2 to 4 of magnetic heads according to the invention differ from the described magnetic head 2 according to FIG. 1 substantially only by the position of the additional coil winding and/or the corresponding arrangement of the extended leg part of the conduction body carrying the magnetic flux. Like parts are provided in the figures with the same reference symbols.

In a modification of the magnetic head 2 according to FIG. 1, the magnet leg 30 facing the substrate 3 is designed in the magnetic head 29 according to FIG. 2 only as a part of the ring-head-like head part 9, i.e., this leg has on the side of this head part facing away from the recording medium M no extension section 19 like the leg 8 according to FIG. 1. In addition, as indicated in FIG. 2, a common part 32 can be realized with the magnet leg 7 and a part 31 of its conduction body corresponding to the extended leg part 22 according to FIG. 1, for instance, by the joint deposition and structuring of corresponding magnetic layers. Due to the shortening of the magnet leg 30 in comparison with the magnet leg 8, the turns of the read coil winding 33 and the write coil winding 34 can lie in different parallel planes.

In the embodiment of a magnetic head 35 according to FIG. 3, the outer magnet leg 7 and an extended leg part 36 of its conduction body 37 carrying the magnetic flux form a common part 38 as in the magnetic head 29 according to FIG. 2. In this magnetic head, a leg 8 extended beyond the ring-headlike head part 9 is provided as shown in FIG. 1. Next to a corresponding read coil 17, however, the turns of its write coil winding 39 are advantageously attached in this magnetic head 35 directly on the surface of the substrate 3 before the individual layers of the extended magnet leg 8 are deposited. The magnet leg 8 with its extension section 19 thus serves as the physical and magnetic separation of the read and write coil winding.

In the magnetic head 40 according to the invention shown in FIG. 4, the extension part 36 shown in FIG. 3 of outer magnet leg 7 beyond the ring-head-like head part 9 is dispensed with, deviating from the magnetic head 35 according to FIG. 3.

In the magnetic heads according to the invention as shown in FIGS. 1 to 4, it had been assumed that the turns of the respective write coil windings cover major parts of one of the magnet legs in the region of the ring-head-like head part 9. However, the write coil windings can also be designed so that their turns come to lie at the magnet leg ends only in the vicinity of the recording magnet poles. A corresponding design of the write coil winding can be executed in a relatively simple manner, especially in embodiments of magnetic heads, wherein the write coil winding is arranged, at least in the region of the ring-head-like head part 9, on the side adjacent the substrate 3 (see FIGS. 3 to 4).

In case of large numbers of turns of the read coil winding, resonances can occur due to the corresponding coil inductance together with unavoidable circuit capacities, which make the use of the magnetic heads more difficult at high transmission rates of, for instance, above 100 MHz. In these cases, the embodiments of the magnetic heads according to FIGS. 2 and 4 are advantageous, wherein the read coil winding does not extend in the region of the extended head part 23 through a space between two magnet leg parts of the conduction body, which is likewise designed in the form of a ring head, but wherein only a single extended leg part is provided which is located between the corresponding parts of the write coil winding and the read coil winding. With this design, a reduction of the inductance of the read coil winding is obtained.

In accordance with the embodiments shown in the figures, it was assumed always that the one or several turns of the write coil winding 20 or 34 or 39 come to lie not only in the region of the ring-head-like head part 9 but also in the region of the extension part 23 of the conduction body 6 or 37, respectively. Especially with single-turn coil windings, however, the respective conductor runs can also be arranged only in the region of the head part 9.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A magnetic thin-film head comprising a stratified build-up on a non-magnetic substrate for a recording medium, the recording medium being provided with a magnetizable storage layer into which information can be written along a track by perpendicular magnetization of the storage layer, the magnetic head comprising a ring shaped magnetic conduction body for carrying magnetic flux, the conduction body comprising two magnet legs having poles facing the recording medium arranged in tandem, as viewed in a direction of relative motion of the head and medium, the poles having a predetermined spacing from each other, the head further comprising an at least largely flat first coil winding for executing a read function when energized, said coil winding having at least one turns extending through a space formed between the magnet legs, the conduction body comprising a further leg extending in a direction facing away from the recording medium, a second, at least largely flat coil winding being provided for executing a write function, said second coil winding being separated from said first coil winding by one of said two magnet legs and said further leg and being arranged on one side of the conduction body, one part of said second coil winding being arranged adjacent to said one of said two magnet legs and an opposite part thereof being arranged adjacent to said further magnet leg, the current in said one part having a first current direction and the current in said opposite part having a current direction opposite to said first current direction, whereby the magnetic flux generated in said further leg is opposed to the magnetic flux generated in said one of said two magnet legs adjacent which said one part of said second coil winding is arranged.

2. The magnetic head recited in claim 1 wherein the first coil winding comprises at least one layer in at least one plane, each said layer having several turns.

3. The magnetic head recited in claim 1, wherein the magnetic conduction body comprises a magnetically soft material.

4. The magnetic head recited in claim 3, wherein the magnetic conduction body comprises a material having easy and hard directions of magnetization, the easy direction of magnetization being directed, at least largely, perpendicularly to the direction of the magnetic flux in said conduction body.

5. The magnetic head recited in claim 1, wherein a distance between ends of the poles of the magnet legs facing the recording medium is at most 1 um.

6. The magnetic head recited in claim 1, wherein an interspace between the magnet legs of the conduction body is provided having a spacing larger than the distance between the ends of the poles facing the recording medium and wherein the turns of the first coil winding are arranged in part.

7. The magnetic head recited in claim 1 wherein the further leg forms a common structural part with one of the magnet legs of the magnetic conduction body.

8. The magnetic head recited in claim 1, wherein turns of the second coil winding are arranged on a side of the magnetic head facing the substrate.

9. The magnetic head recited in claim 8, wherein the turns of the second coil winding are arranged, at least in part, on the side of the magnetic head facing the substrate in a region of a pole of an adjacent magnet leg.

10. The magnetic head recited in claim 1 wherein the magnetic conduction body has a magnetic interruption in a transition region between the ring shaped conduction body and the further leg comprising an extension of one of said magnet legs.

11. The magnetic head recited in claim 1 wherein the said second coil winding has one or several turns in at least one plane.

12. The magnetic head recited in claim 1, wherein the first coil winding is shunted at its ends by a resistor having a predetermined low resistance value during the write function.

* * * * *